United States Patent
Brooks et al.

(10) Patent No.: US 9,026,777 B2
(45) Date of Patent: *May 5, 2015

(54) AUTOMATIC UPDATE OF PERSISTENT BOOT PARAMETER STORAGE

(71) Applicant: International Business Machines Corporation, Armonk, NY (US)

(72) Inventors: Mark A. Brooks, Gaylordsville, CT (US); Walter W. Otto, Clinton Corners, NY (US); Neil Shah, Wappingers Falls, NY (US); Stephen C. Warren, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/101,446

(22) Filed: Dec. 10, 2013

(65) Prior Publication Data

US 2014/0101427 A1   Apr. 10, 2014

Related U.S. Application Data

(63) Continuation of application No. 13/450,581, filed on Apr. 19, 2012.

(51) Int. Cl.
*G06F 9/00* (2006.01)
*G06F 9/44* (2006.01)

(52) U.S. Cl.
CPC .............. *G06F 9/4406* (2013.01); *G06F 9/00* (2013.01)

(58) Field of Classification Search
CPC .......................................................... G06F 8/65
USPC ........................................................... 713/1, 2
See application file for complete search history.

(56) References Cited

U.S. PATENT DOCUMENTS

| | | | |
|---|---|---|---|
| 6,446,260 | B1 | 9/2002 | Wilde et al. |
| 2003/0177209 | A1* | 9/2003 | Kwok et al. .................. 709/221 |
| 2006/0080650 | A1* | 4/2006 | Winters et al. ................ 717/168 |
| 2006/0212691 | A1* | 9/2006 | Wood et al. ....................... 713/1 |
| 2007/0203943 | A1* | 8/2007 | Adlung et al. ............. 707/104.1 |
| 2011/0010708 | A1 | 1/2011 | Lassonde et al. |

* cited by examiner

*Primary Examiner* — Jaweed A Abbaszadeh
*Assistant Examiner* — Alyaa T Mazyad
(74) *Attorney, Agent, or Firm* — Cantor Colburn LLP; William A. Kinnaman, Jr.

(57) ABSTRACT

A computer system includes a memory, the memory comprising a hardware boot parameter storage area; an operating system running on the computer system; and reboot logic configured to: store updated boot parameters for the operating system in the hardware boot parameter storage area in the memory; perform a reboot of the operating system with the updated boot parameters; determine whether the reboot of the operating system is successful, and, in the event the reboot of the operating system is successful, automatically propagate the updated boot parameters to a persistent boot parameter storage area.

9 Claims, 3 Drawing Sheets

AUTOMATIC UPDATE OF PERSISTENT BOOT PARAMETER STORAGE

CROSS-REFERENCE TO RELATED APPLICATION

This application is a continuation of U.S. application Ser. No. 13/450,581 (Brooks et al.), filed on Apr. 19, 2012, which is herein incorporated by reference in its entirety.

BACKGROUND

This disclosure relates generally to the field of computer systems, and more particularly, to updating of reboot parameters for an operating system on a computer system.

An operating system (OS) is a software program that manages computer hardware resources in a computer system and provides common services for application software that runs on the OS. A computer system may run a single OS, or may include a plurality of partitions that comprise individual virtualized computers running on the same physical computer system. The various partitions may run different instances of the same OS, or different respective OSs. The process of starting up an OS on a computer system is referred to as a boot process. A boot process may be governed by various boot parameters. Respective boot parameters may be defined for the boot processes of the various partitions. The boot parameters may define, for example, the software configuration of the OS, or a location in the memory of the computer system for the partition. In order to change the configuration of an OS on a computer system, the partition's boot parameters may need to be changed by a user, for example, a developer or system administrator of the computer system.

BRIEF SUMMARY

In one aspect, a computer system includes a memory, the memory comprising a hardware boot parameter storage area; an operating system running on the computer system; and reboot logic configured to: store updated boot parameters for the operating system in the hardware boot parameter storage area in the memory; perform a reboot of the operating system with the updated boot parameters; determine whether the reboot of the operating system is successful, and, in the event the reboot of the operating system is successful, automatically propagate the updated boot parameters to a persistent boot parameter storage area.

Additional features are realized through the techniques of the present exemplary embodiment. Other embodiments are described in detail herein and are considered a part of what is claimed. For a better understanding of the features of the exemplary embodiment, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Embodiments of systems and methods for automatically updating persistent boot parameter storage for a computer system are provided, with exemplary embodiments being discussed below in detail. When the boot parameters for a partition are updated by a user of the computer system before a reboot of the partition, the updated boot parameters may not be automatically propagated to persistent boot parameter storage or to a graphical user interface (GUI) that is used to reboot the partition. This may cause the updated parameters to be lost during the reboot of the partition, so that the next time the partition is rebooted, the partition may boot with the previous, non-updated boot parameters, which may cause an out-of-sync condition for the partition. The user may manually update the reboot GUI with the updated boot parameters after the reboot of the partition; however, manual GUI updates may be prone to error. An out-of-sync condition in the partition may cause problems such as data loss, security exposures, application problems, or service level agreement (SLA) penalties. In order to prevent such an out-of-sync condition, automatic updating of persistent boot parameter storage is provided for updated boot parameters. A hardware boot parameter storage area retains the updated boot parameters across the reboot of the partition, and, if the reboot is successful, the updated boot parameters may be automatically propagated to the persistent boot parameter storage and, in some embodiments, the reboot GUI. Automatic update of persistent boot parameter storage may be used in conjunction with any appropriate type of computer system, including but not limited to a z/OS computer system with multiple partitions.

When the user updates the boot parameters for a partition, the updated boot parameters are placed in the hardware boot parameter storage when the reboot service for the partition is invoked. The hardware boot parameter storage is a specific location in the memory of the computer system. The partition may then be rebooted using the updated parameters. If the reboot of the partition is successful, the updated boot parameters may then be automatically promoted from the hardware boot parameter storage to the persistent boot parameter storage. If the reboot of the partition is unsuccessful, the persistent boot parameter storage will retain the non-updated boot parameters. Such management of the persistent boot parameter storage helps to avoid user error in configuration of boot parameters for a partition on a computer system.

Figure 1:
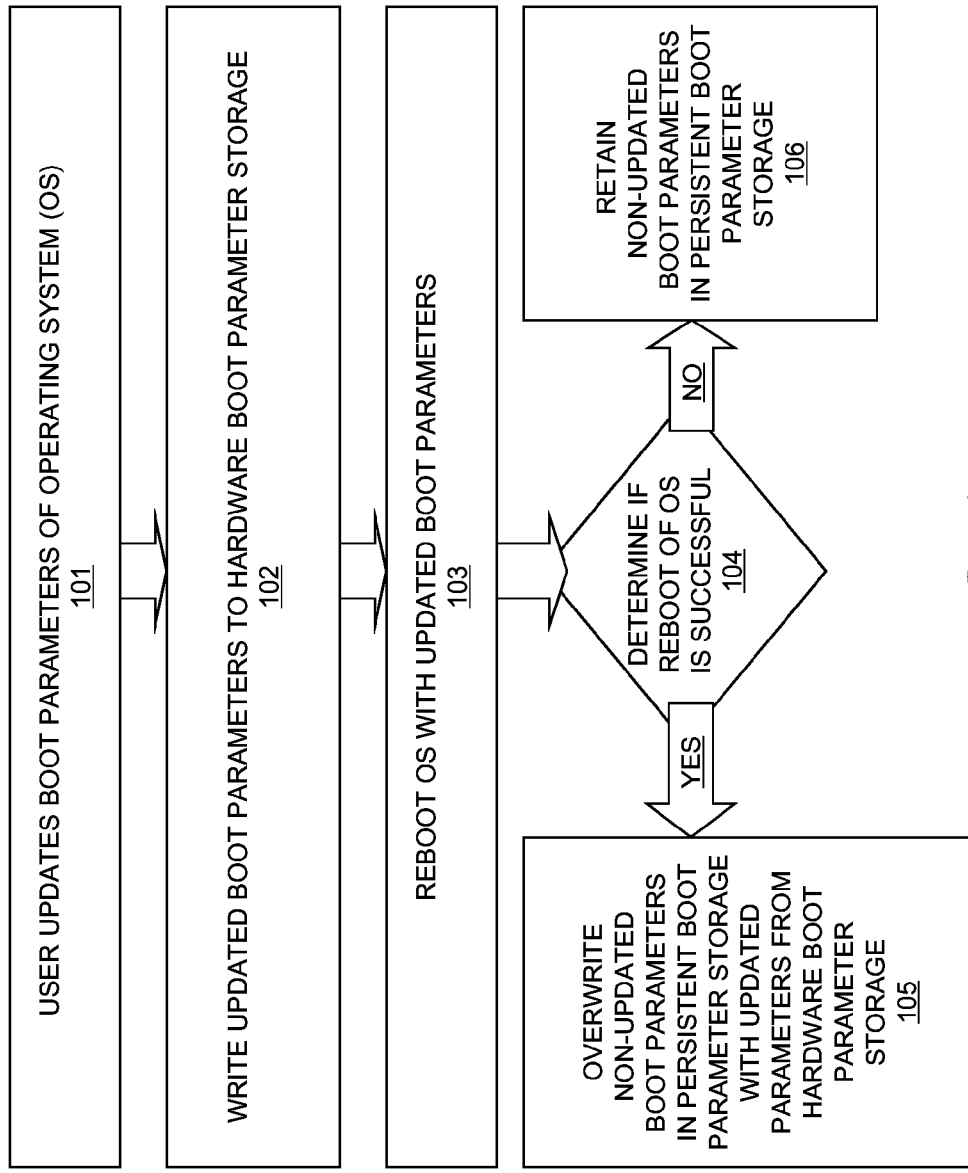
FIG. 1 illustrates a flowchart of an embodiment of a method for automatically updating persistent boot parameter storage for a computer system.

FIG. 1 illustrates a flowchart of an embodiment of a method 100 for automatically updating persistent boot parameter storage. First, in block 101 of method 100, a user, such as a developer or system administrator, updates the boot parameters of an OS of a computer system. The OS may be running in a partition on a computer system that hosts a plurality of partitions in some embodiments or, in other embodiments, the OS may be the primary OS running on the computer system. The boot parameters may be updated by the user via a GUI in some embodiments. The boot parameters may be any parameters that are used by the computer system during booting of the OS, and may define, for example, the software configuration of the OS, or a location in the memory of the computer system for the partition. In some embodiments, the user may also set a flag indicating whether the system should automatically propagate the updated boot parameters. Then, in block 102 of method 100, the OS writes the updated boot parameters to the hardware boot parameter storage. The hardware boot parameter storage may comprise a special hardware area in the memory of the computer system. Next, in block 103 of method 100, the user invokes a reboot of the OS, and the OS reboots with the updated boot parameters. The user may invoke the reboot of the OS via the GUI that was used to update the boot parameters in some embodiments.

Flow then proceeds to block 104 of method 100, in which it is determined whether the reboot of the OS that was invoked in block 103 of method 100 was successfully completed. This determination may be made based on a prompt of the user by the OS after the reboot in some embodiments. If the reboot of the OS is determined to be successful in block 104 of method 100, flow proceeds to block 105, and the updated boot parameters are propagated from the hardware boot parameter storage to the persistent boot parameter storage, overwriting the previous, non-updated boot parameters. Propagation of the updated boot parameters may be performed automatically in some embodiments, or may be performed based on, for example, the setting of a propagation flag by the user in other embodiments. The persistent boot parameter storage may be located in any appropriate location, including but not limited to a separate computer system. This propagation may include propagating the updated boot parameters to the GUI that was used to invoke the reboot of the OS. This ensures that next time the OS is rebooted, the updated boot parameters may be used. In some embodiments, the computer system may also determine whether the boot parameters in the hardware boot parameter storage match the boot parameters that were used in the reboot of block 103 before writing the boot parameters from the hardware boot parameter storage to the persistent boot parameter storage, as another user may have changed the configuration of the OS during the flow of method 100 of FIG. 1.

If the reboot of the OS is determined not to be successful in block 104 of method 100, flow proceeds to block 106, in which the updated boot parameters are not propagated to the persistent boot parameter storage, and the previous, non-updated boot parameters for the OS are left in place in the persistent boot parameter storage, such that next time the OS is rebooted, the previous, non-updated boot parameters may be used. The updated boot parameters may be discarded from the hardware boot parameter storage during block 106 of method 100 in some embodiments.

An embodiment of the flow of method 100 of FIG. 1 is now described with respect to rebooting of a logical partition (LPAR) on a z/OS computer system. The boot process of an LPAR on a z/OS computer system is referred to as an initial program load (IPL), and AutoIPL is a z/OS function that can automatically re-IPL (i.e., reboot) a z/OS LPAR, or initiate a stand-alone dump of the z/OS LPAR and then optionally re-IPL the z/OS LPAR. The hardware management console (HMC)/support element (SE) is a GUI interface that is used to update the IPL parameters (i.e., boot parameters) of an LPAR and re-IPL the LPAR in a z/OS computer system. The HMC acts as configuration repository for the IPL parameters for the LPARs on a z/OS computer system. Flow of method 100 of FIG. 1 in a z/OS computer system begins in block 101, in which the user enters updated IPL parameters for an LPAR through a configuration file called a DIAGxx member in PARMLIB, and also sets a parameter, or flag, called AutoHMC in that file. The two available values for AutoHMC may be yes (i.e., true) or no (i.e., false). If AutoHMC is set to no, the new IPL parameters will not be propagated to persistent boot parameter storage (i.e., the HMC) during AutoIPL, and flow of method 100 ends. However, if AutoHMC is set to yes by the user, the updated IPL parameters and the AutoHMC parameter are stored in the hardware boot parameter storage during block 102 of FIG. 2. In some embodiments, the hardware boot parameter storage may comprise a system control program (SCP) storage area, which is a reserved storage area in System z whose contents are preserved across an IPL.

Flow of method 100 then proceeds to block 103 of FIG. 1, in which, after the z/OS workload is quiesced, the user invokes AutoIPL to initiate a re-IPL of the LPAR. AutoIPL then initiates the IPL process of the LPAR with the updated IPL parameters. During the IPL of the LPAR, the new instance of z/OS is instantiated, and after the reboot extracts the updated IPL parameters from the hardware boot parameter storage. Next, in block 104, it is determined whether the re-IPL of the LPAR with the updated IPL parameters was successful. If it is determined in block 104 that the re-IPL was successful, flow proceeds to block 105, in which the system determines whether the IPL parameters are to be propagated to the HMC. This is determined based on the AutoHMC parameter that was stored in the hardware boot parameter storage during block 102 of method 100, and also based on whether the IPL parameters that are stored in the hardware boot parameter storage match the parameters that were used to re-IPL the LPAR during block 103. If AutoHMC is set to yes and the updated IPL parameters match the IPL parameters that were used to re-IPL the LPAR, the computer system automatically propagates the updated IPL parameters from the hardware boot parameter storage to the HMC. In some embodiments, z/OS BCPii may be used to perform the updates to the HMC. Then, the next time the LPAR is re-IPLed using the HMC, the updated IPL parameters will automatically be available in the HMC. However, if it was determined in block 104 that the reboot was unsuccessful, the system retains the previous, non-updated IPL parameters in the HMC in block 106 of method 100.

Figure 2:
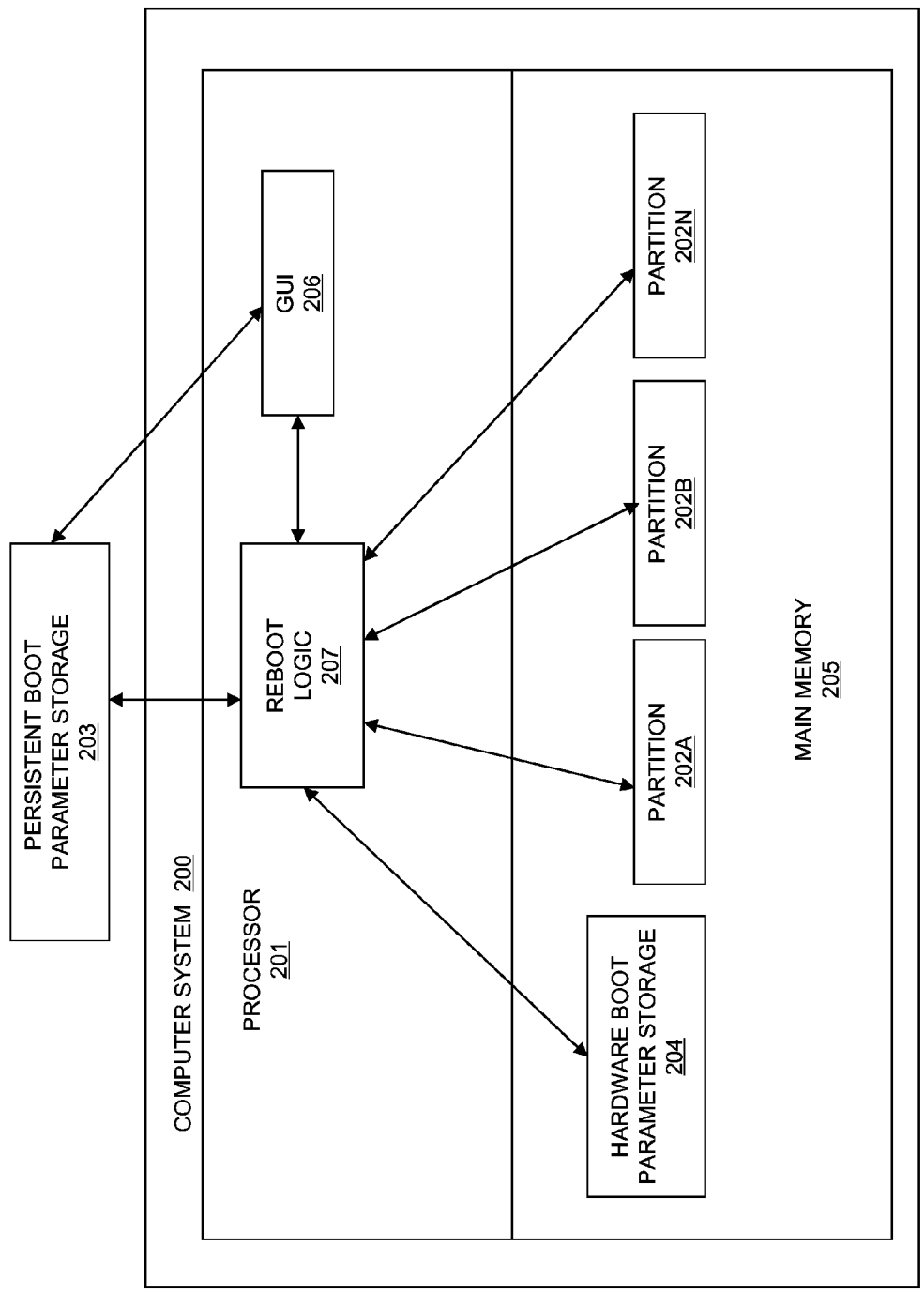
FIG. 2 illustrates a block diagram of an embodiment of a computer system including hardware boot parameter storage and persistent boot parameter storage.

An example of a computer system 200 including hardware boot parameter storage 204 and persistent boot parameter storage 203 is shown in FIG. 2. Computer system 200 may comprise any appropriate type of computer system, including but not limited to a z/OS computer system, and includes a processor 201 and main memory 205. The main memory 205 holds a plurality of partitions 202A-N. Partitions 202A-N are shown for illustrative purposes only; a computer system such as computer system 200 may include any appropriate number of partitions and the partitions may run any appropriate respective OS. Boot parameters for partitions 202A-N are stored in persistent boot parameter storage 203. The persistent boot parameter storage 203 may be in any appropriate location with respect to computer system 200, including but not limited to main memory 205 or a separate computer (for example, a laptop computer connected to computer system 200) in various embodiments. Main memory 205 includes hardware boot parameter storage 204, which is a special hardware location in main memory 205 that preserves its contents across reboot of any of partitions 202A-N. Reboot logic 207 in the processor 201 may implement method 100 of FIG. 1 in conjunction with partitions 202A-N, and be used to reboot any of partitions 202A-N. A user of the computer system 200 may control reboot logic 207 via GUI 206. When a user updates the boot parameters of, for example, partition 202A via GUI 206, the updated boot parameters are written into hardware boot parameter storage 204. The partition 202A may then be rebooted by the user via GUI 206 and reboot logic 207 using the updated boot parameters stored in hardware boot parameter storage 204. Then, if the reboot of partition 202A is determined to be successful, the updated boot parameters may be automatically propagated from hardware boot parameter storage 204 to persistent boot parameter storage 203, and additionally propagated to the GUI 206 for the partition 202A, such that the next time the user wishes to reboot partition 202A the updated boot parameters are available for use. If the reboot of partition 202A is unsuccessful, the updated boot parameters are not propagated to the persistent boot parameter storage 203, such that the previous, non-updated boot parameters for partition 202A are kept for future use.

Figure 3:
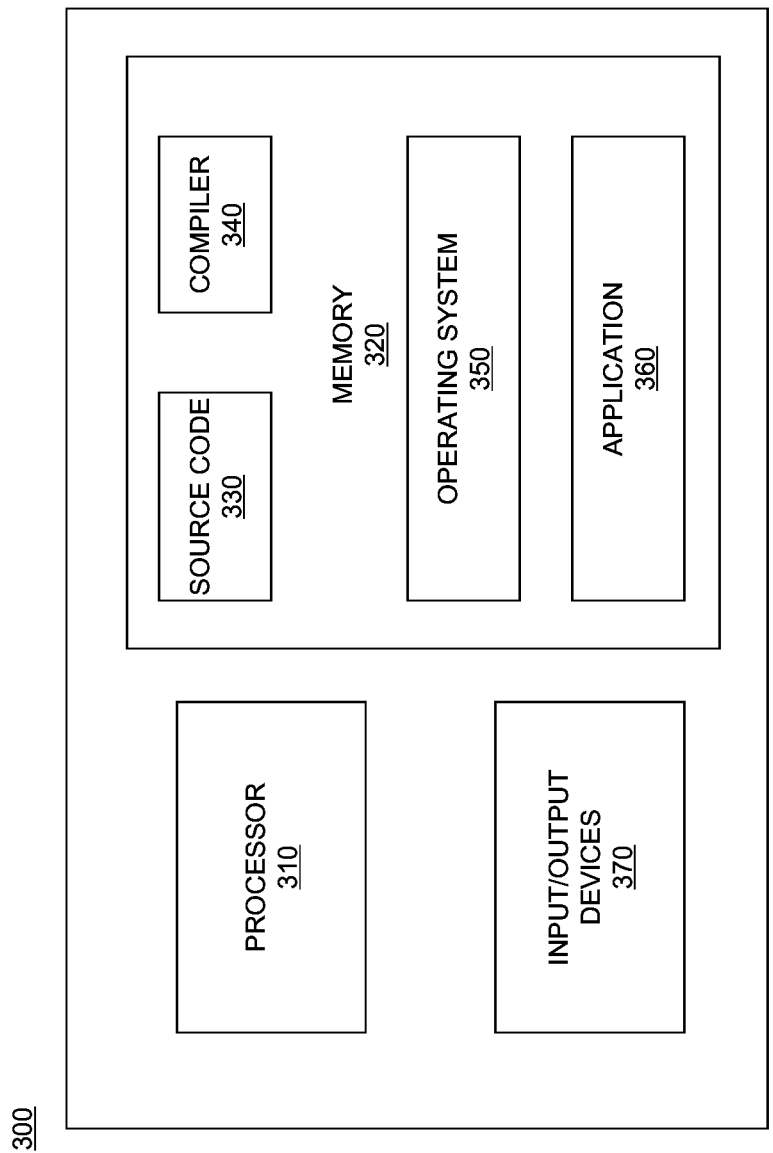
FIG. 3 illustrates a block diagram of an embodiment of a computer system that may be used in conjunction with systems and methods for automatically updating persistent boot parameter storage.

FIG. 3 illustrates an example of a computer 300 which may be utilized by exemplary embodiments of systems and methods for automatically updating persistent boot parameter storage as embodied in software. Various operations discussed above may utilize the capabilities of the computer 300. One or more of the capabilities of the computer 300 may be incorporated in any element, module, application, and/or component discussed herein.

The computer 300 includes, but is not limited to, PCs, workstations, laptops, PDAs, palm devices, servers, storages, and the like. Generally, in terms of hardware architecture, the computer 300 may include one or more processors 310, memory 320, and one or more input and/or output (I/O) devices 370 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 310 is a hardware device for executing software that can be stored in the memory 320. The processor 310 can be virtually any custom made or commercially available processor, a central processing unit (CPU), a digital signal processor (DSP), or an auxiliary processor among several processors associated with the computer 300, and the processor 310 may be a semiconductor based microprocessor (in the form of a microchip) or a macroprocessor.

The memory 320 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 320 may incorporate electronic, magnetic, optical, and/or other types of storage media. Note that the memory 320 can have a distributed architecture, where various components are situated remote from one another, but can be accessed by the processor 310.

The software in the memory 320 may include one or more separate programs, each of which comprises an ordered listing of executable instructions for implementing logical functions. The software in the memory 320 includes a suitable operating system (O/S) 350, compiler 340, source code 330, and one or more applications 360 in accordance with exemplary embodiments. As illustrated, the application 360 comprises numerous functional components for implementing the features and operations of the exemplary embodiments. The application 360 of the computer 300 may represent various applications, computational units, logic, functional units, processes, operations, virtual entities, and/or modules in accordance with exemplary embodiments, but the application 360 is not meant to be a limitation.

The operating system 350 controls the execution of other computer programs, and provides scheduling, input-output control, file and data management, memory management, and communication control and related services. It is contemplated by the inventors that the application 360 for implementing exemplary embodiments may be applicable on all commercially available operating systems.

Application 360 may be a source program, executable program (object code), script, or any other entity comprising a set of instructions to be performed. When the application is a source program, then the program is usually translated via a compiler (such as the compiler 340), assembler, interpreter, or the like, which may or may not be included within the memory 320, so as to operate properly in connection with the O/S 350. Furthermore, the application 360 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 370 may include input devices such as, for example but not limited to, a mouse, keyboard, scanner, microphone, camera, etc. Furthermore, the I/O devices 370 may also include output devices, for example but not limited to a printer, display, etc. Finally, the I/O devices 370 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 370 also include components for communicating over various networks, such as the Internet or intranet.

If the computer 300 is a PC, workstation, intelligent device or the like, the software in the memory 320 may further include a basic input output system (BIOS) (omitted for simplicity). The BIOS is a set of essential software routines that initialize and test hardware at startup, start the O/S 350, and support the transfer of data among the hardware devices. The BIOS is stored in some type of read-only-memory, such as ROM, PROM, EPROM, EEPROM or the like, so that the BIOS can be executed when the computer 300 is activated.

When the computer 300 is in operation, the processor 310 is configured to execute software stored within the memory 320, to communicate data to and from the memory 320, and to generally control operations of the computer 300 pursuant to the software. The application 360 and the O/S 350 are read, in whole or in part, by the processor 310, perhaps buffered within the processor 310, and then executed.

When the application 360 is implemented in software it should be noted that the application 360 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 360 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 360 is implemented in hardware, the application 360 can be implemented with any one or a combination of the following technologies, which are well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The technical effects and benefits of exemplary embodiments include avoiding errors in the updating of boot parameters in a computer system.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A computer system comprising:
a plurality of partitions;
a main memory, the main memory comprising a hardware boot parameter storage area;
an operating system running on a first partition of the plurality of partitions the computer system; and
reboot logic configured to:
boot the operating system of the first partition of the plurality of partitions of the computer system based on first boot parameters corresponding to the first partition that are stored in a persistent boot parameter storage area, wherein the persistent boot parameters storage area stores respective boot parameters for each of the plurality of partitions;
receive updated boot parameters for the operating system of the first partition from a user;
store the updated boot parameters for the operating system of the first partition of the computer system in the hardware boot parameter storage area in the main memory, the hardware boot parameter storage area being distinct from the persistent boot parameter storage area, and wherein the hardware boot parameter storage area and the persistent boot parameters storage area are not located in any of the plurality of partitions;
perform a reboot of the operating system in the first partition based on the updated boot parameters that are stored in the hardware boot parameter storage area;
determine whether the reboot of the operating system in the first partition based on the updated boot parameters was successful; and,
based on the reboot of the operating system in the first partition based on the updated boot parameters being successful, automatically propagate the updated boot parameters from the hardware boot parameter storage area to the persistent boot parameter storage area.

2. The system of claim 1, wherein the reboot of the operating system is performed by a user via a graphical user interface (GUI), and further comprising automatically propagating the updated boot parameters to the GUI in the event the reboot of the operating system is successful.

3. The system of claim 2, wherein the operating system comprises a z/OS operating system, wherein the GUI comprises Hardware Management Console (HMC), wherein the hardware boot parameter storage area comprises a system control program (SCP) storage area, and wherein the reboot of the operating system comprises a re-initial program load (re-IPL) of a logical partition running the operating system.

4. The system of claim 1, further comprising based on the reboot of the operating system in the first partition not being successful, retaining the first boot parameters of the operating system in the persistent boot parameter storage area.

5. The system of claim 1, wherein the computer system comprises a first computer system, and wherein the persistent boot parameter storage area is located on a second computer system that is distinct from the first computer system.

6. The system of claim 1, wherein determining whether the reboot of the operating system is successful further comprises determining whether the updated boot parameters stored in the hardware boot parameter storage area match boot parameters that were used to reboot the operating system.

7. The system of claim 1, wherein automatically propagating the updated boot parameters to the persistent boot parameter storage area comprises overwriting first boot parameters corresponding to the first partition that are stored in the persistent boot parameter storage area with the updated boot parameters.

8. The system of claim 1, wherein storing the updated boot parameters for the operating system in the persistent boot parameter storage area is performed in response to setting an automatic propagation flag by the user.

9. The system of claim 1, wherein the determination of whether the reboot of the operating system is successful is performed based on a prompt of the user by the operating system.

* * * * *